United States Patent
Yu et al.

(10) Patent No.: US 12,488,470 B2
(45) Date of Patent: Dec. 2, 2025

(54) SINGLE-STAGE OPEN-VOCABULARY PANOPTIC SEGMENTATION

(71) Applicant: Lemon Inc., Grand Cayman (KY)

(72) Inventors: Qihang Yu, Los Angeles, CA (US); Ju He, Los Angeles, CA (US); Xueqing Deng, Los Angeles, CA (US); Xiaohui Shen, Los Angeles, CA (US); Liang-Chieh Chen, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 288 days.

(21) Appl. No.: 18/365,060

(22) Filed: Aug. 3, 2023

(65) Prior Publication Data

US 2025/0045929 A1  Feb. 6, 2025

(51) Int. Cl.
*G06K 9/00* (2022.01)
*G06T 3/40* (2006.01)
(Continued)

(52) U.S. Cl.
CPC .................. *G06T 7/12* (2017.01); *G06T 3/40* (2013.01); *G06V 10/44* (2022.01); *G06V 10/764* (2022.01);
(Continued)

(58) Field of Classification Search
CPC .......... G06N 3/08; G06N 3/045; G06N 3/044; G06N 3/047; G06N 3/048; G06N 3/084;
(Continued)

(56) References Cited

U.S. PATENT DOCUMENTS

2018/0082171 A1\* 3/2018 Merity ................... G06N 3/045
2020/0074271 A1\* 3/2020 Liang .................... G06V 10/82
(Continued)

OTHER PUBLICATIONS

Kavitha Sundarrajan, Baskaran Kuttva Rajendran, Dhanapriya Balasubramanian, Fusion of Ensembled UNET and Ensembled FPN for Semantic Segmentation, Feb. 28, 2023, IIETA (Year: 2023).\*
(Continued)

*Primary Examiner* — Alex Kok S Liew
(74) *Attorney, Agent, or Firm* — Alleman Hall & Tuttle LLP (57) ABSTRACT

Single-stage frameworks for open-vocabulary panoptic segmentation are provided. One aspect provides a computing system comprising a processor and memory storing instructions that, when executed by the processor, cause the processor to: receive an image; extract a plurality of feature maps from the image using a convolutional neural network-based vision-language model; generate a plurality of pixel features from the plurality of feature maps; generate a plurality of mask predictions from the plurality of pixel features; generate a plurality of in-vocabulary class predictions corresponding to the plurality of mask predictions using the plurality of pixel features; generate a plurality of out-of-vocabulary class predictions using the plurality of feature maps; perform geometric ensembling on the plurality of in-vocabulary class predictions and the plurality of out-of-vocabulary class predictions to generate a plurality of final class predictions; and output the plurality of mask predictions and the plurality of final class predictions.

20 Claims, 7 Drawing Sheets

(51) Int. Cl.
   *G06T 7/12*   (2017.01)
   *G06V 10/44*  (2022.01)
   *G06V 10/764* (2022.01)
   *G06V 10/771* (2022.01)

(52) U.S. Cl.
   CPC .. *G06V 10/771* (2022.01); *G06T 2207/20084* (2013.01)

(58) Field of Classification Search
   CPC .......... G06N 5/01; G06N 3/0455; G06N 7/01; G06N 20/00; G06N 3/02; G06N 3/042; G06N 3/043; G06N 3/0895; G06N 3/094; G06N 3/006; G06N 3/0475; G06N 3/092; G06N 3/096; G06N 5/045; G06N 5/046; G06F 40/284; G06F 2207/4824; G06F 40/205; G06F 40/216; G06F 40/30; G06F 40/35; G06F 40/186; G06F 40/242; G06F 40/253; G06F 40/274; G06F 40/295; G06F 40/40; G06F 40/56; G06V 10/82; G06V 10/44; G06V 10/764; G06V 10/771; G06V 10/7715; G06V 10/806
   See application file for complete search history.

(56) References Cited

U.S. PATENT DOCUMENTS

| | | | |
|---|---|---|---|
| 2021/0081500 A1* | 3/2021 | Dash | G06N 5/01 |
| 2022/0300718 A1* | 9/2022 | Chen | G06N 3/043 |

OTHER PUBLICATIONS

Carion, N. et al., "End-to-End Object Detection with Transformers," Proceedings of the Computer Vision—ECCV 2020: 16th European Conference, Aug. 23, 2020, Glasgow, UK, 26 pages.

Chen, Z. et al., "Vision Transformer Adapter for Dense Predictions," Proceedings of the Eleventh International Conference on Learning Representations (ICLR 2023), May 1, 2023, Kigali, Rwanda, 20 pages.

Cheng, B. et al., "Mask2Former for Video Instance Segmentation," arXiv:2112.10764v1 [cs.CV], Dec. 20, 2021, 3 pages.

Cho, S. et al., "CAT-Seg: Cost Aggregation for Open-Vocabulary Semantic Segmentation," arXiv:2303.11797v2 [cs.CV], Mar. 31, 2024, 21 pages.

Ding, Z. et al., "Open-Vocabulary Universal Image Segmentation with MaskCLIP," Proceedings of the 40th International Conference on Machine Learning (ICML'23), Jun. 23, 2023, Honolulu, Hawaii, 13 pages.

Dosovitskiy, A. et al., "An Image is Worth 16x16 Words: Transformers for Image Recognition at Scale," Proceedings of the International Conference on Learning Representations (ICLR 2021), May 4, 2025, Vienna, Austria, 22 pages.

Ghiasi, G. et al., "Scaling Open-Vocabulary Image Segmentation with Image-Level Label," Proceedings of the Computer Vision—ECCV 2022: 17th European Conference, Oct. 23, 2022, Tel Aviv, Israel, 27 pages.

Gu, X. et al., "Open-vocabulary Object Detection via Vision and Language Knowledge Distillation," arXiv:2104.13921v3 [cs.CV], May 12, 2022, 21 pages.

He, K. et al., "Deep Residual Learning for Image Recognition," Proceedings of the 2016 IEEE Conference on Computer Vision and Pattern Recognition (CVPR), Jun. 27, 2016, Las Vegas, Nevada, 12 pages.

Kuhn, H. W., "The Hungarian method for the assignment problem," Naval Research Logistics Quarterly, vol. 2, Issue 1-2, Mar. 1955, 15 pages. Submitted as abstract.

Liang, F. et al., "Open-Vocabulary Semantic Segmentation with Mask-adapted CLIP," Proceedings of the 2023 IEEE/CVF Conference on Computer Vision and Pattern Recognition (CVPR), Jun. 17, 2023, Vancouver, Canada, 13 pages.

Liu, Z. et al., "A ConvNet for the 2020s," Proceedings of the 2022 IEEE/CVF Conference on Computer Vision and Pattern Recognition (CVPR), Jun. 19, 2022, New Orleans, Louisiana, 15 pages.

Long, J. et al., "Fully Convolutional Networks for Semantic Segmentation," Proceedings of the 2015 IEEE Conference on Computer Vision and Pattern Recognition (CVPR), Jun. 7, 2015, Boston, Massachusetts, 10 pages.

Vaswani, A. et al., "Attention Is All You Need," Proceedings of the 31st Conference on Neural Information Processing Systems (NIPS 2017), Dec. 4, 2017, Long Beach, California, 15 pages.

Wang, H. et al., "Axial-DeepLab: Stand-Alone Axial-Attention for Panoptic Segmentation," Proceedings of the Computer Vision—ECCV 2020: 16th European Conference, Aug. 23, 2020, Glasgow, UK, 26 pages.

Wang, H. et al., "MaX-DeepLab: End-to-End Panoptic Segmentation with Mask Transformers," Proceedings of the 2021 IEEE/CVF Conference on Computer Vision and Pattern Recognition (CVPR), Jun. 20, 2021, Virtual, 20 pages.

Xu, J. et al., "Open-Vocabulary Panoptic Segmentation with Text-to-Image Diffusion Models," Proceedings of the 2023 IEEE/CVF Conference on Computer Vision and Pattern Recognition (CVPR), Jun. 17, 2023, Vancouver, Canada, 18 pages.

Xu, M. et al., "A Simple Baseline for Open-Vocabulary Semantic Segmentation with Pre-trained Vision-language Model," arXiv:2112.14757v2 [cs.CV], Dec. 29, 2022, 22 pages.

Xu, M. et al., "Side Adapter Network for Open-Vocabulary Semantic Segmentation," IEEE Transactions on Pattern Analysis and Machine Intelligence, vol. 45, Issue 12, Dec. 2023, 12 pages.

Yu, Q. et al., "k-means Mask Transformer," Proceedings of the Computer Vision - ECCV 2022: 17th European Conference, Oct. 23, 2022, Tel Aviv, Israel, 20 pages.

Zhou, C. et al., "Extract Free Dense Labels from CLIP," Proceedings of the Computer Vision—ECCV 2022: 17th European Conference, Oct. 23, 2022, Tel Aviv, Israel, 22 pages.

* cited by examiner

| method | params (M) frozen | params (M) trainable | zero-shot test dataset ADE20K PQ | zero-shot test dataset ADE20K mIoU | training dataset COCO PQ | training dataset COCO mIoU |
|---|---|---|---|---|---|---|
| MaskCLIP | 304 | 63 | 15.1 | 23.7 | - | - |
| FreeSeg | - | - | 16.3 | 24.6 | - | - |
| ODISE | 1494 | 28 | 22.6 | 29.9 | 55.4 | 65.2 |
| ODISE (caption) | 1494 | 28 | 23.4 | 28.7 | 45.6 | 52.4 |
| FC-CLIP | 200 | 34 | 24.5 | 30.9 | 54.9 | 64.5 |

FIG. 4

| method | zero-shot test dataset Mapillary Vistas PQ | SQ | RQ | Cityscapes PQ | SQ | RQ |
|---|---|---|---|---|---|---|
| ODISE | 14.2 | 61.0 | 17.2 | 23.9 | 75.3 | 29.0 |
| FC-CLIP | 17.0 | 52.9 | 21.7 | 43.0 | 73.9 | 52.9 |

FIG. 5

| method | training dataset | mIoU A-847 | PC-459 | A-150 | PC-59 | PAS-21 |
|---|---|---|---|---|---|---|
| OpenSeg | COCO Panoptic + COCO Caption | 6.3 | 9.0 | 21.1 | 42.1 | - |
| ODISE (caption) | COCO Panoptic + COCO Caption | 11.0 | 13.8 | 28.7 | 55.3 | 82.7 |
| MaskCLIP | COCO Panoptic | 8.2 | 10.0 | 23.7 | 45.9 | - |
| ODISE | COCO Panoptic | 11.1 | 14.5 | 29.9 | 57.3 | 84.6 |
| FC-CLIP | COCO Panoptic | 11.4 | 15.0 | 30.9 | 57.4 | 84.7 |

FIG. 6

| method | ADE20K | COCO |
|---|---|---|
| ODISE | 0.41 | 0.39 |
| FC-CLIP | 1.82 (4.44×) | 2.17 (5.56×) |

FIG. 7

| method | zero-shot test dataset COCO | | | training dataset ADE20K | | |
|---|---|---|---|---|---|---|
| | PQ | SQ | RQ | PQ | SQ | RQ |
| FreeSeg | 16.5 | 72.0 | 21.6 | - | - | - |
| ODISE | 25.0 | 79.4 | 30.4 | 31.4 | 77.9 | 36.9 |
| FC-CLIP | 26.7 | 76.4 | 32.8 | 49.9 | 82.8 | 59.1 |

SINGLE-STAGE OPEN-VOCABULARY PANOPTIC SEGMENTATION

BACKGROUND

Panoptic segmentation is a class of image segmentation techniques that combines the distinct tasks of semantic segmentation and instance segmentation, resulting in a general unified output. It is a complex computer vision problem that aims to predict a set of non-overlapping masks, each with its corresponding class label. Semantic segmentation interprets high-level category semantic concepts. Semantic segmentation tasks can involve detecting objects within an image and grouping them based on semantic categories, typically by assigning each pixel in an image a semantic category. Instance segmentation groups foreground pixels into different object instances, which allows for identifying and separating distinct, individual objects within an image. Instance segmentation tasks can be performed with mask classification, where a set of bounding boxes and binary masks identifying different object instances are predicted.

SUMMARY

Single-stage frameworks for open-vocabulary panoptic segmentation are provided. One aspect provides a computing system comprising a processor and memory storing instructions that, when executed by the processor, cause the processor to: receive an image; extract a plurality of feature maps from the image using a convolutional neural network-based vision-language model; generate a plurality of pixel features from the plurality of feature maps; generate a plurality of mask predictions from the plurality of pixel features; generate a plurality of in-vocabulary class predictions corresponding to the plurality of mask predictions using the plurality of pixel features; generate a plurality of out-of-vocabulary class predictions using the plurality of feature maps; perform geometric ensembling on the plurality of in-vocabulary class predictions and the plurality of out-of-vocabulary class predictions to generate a plurality of final class predictions; and output the plurality of mask predictions and the plurality of final class predictions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Panoptic segmentation seeks holistic scene understanding, combining semantic segmentation and instance segmentation tasks. One approach to panoptic segmentation includes closed-vocabulary models. Due to the high cost of annotating fine-grained datasets, the number of semantic categories defined in closed-vocabulary panoptic segmentation models typically ranges from a few dozen to a few hundred. This hinders the further application of closed-vocabulary approaches to real-world settings where the number of possible semantic classes can be infinite. In contrast, open-vocabulary approaches attempt to cure this deficiency by segmenting arbitrary classes, including those that cannot be accessed during the training procedure.

Open-vocabulary segmentation can be implemented to use text embeddings of category names (which can be represented in natural language) as label embeddings instead of learning them from the training dataset. This allows for the segmentation and recognition of objects from an open set of categories in diverse environments, enabling the classification of objects with a wider vocabulary. To provide meaningful embeddings, a pretrained text encoder can be used to effectively capture the semantic meaning of words and phrases.

Current methods for open-vocabulary panoptic segmentation are generally implemented using two-stage frameworks with multi-modal models. For example, vision-language models can be implemented to encode vision and language jointly in a fusion model. Such models can be used for their ability to map image and text features to a shared embedding space and to learn aligned image-text feature representations from large-scale Internet data. Some models extract visual representations using pretrained object detectors and fine-tune on downstream tasks using language supervision. Examples of vision-language models include contrastive language-image pre-training (CLIP) models and large-scale image and noisy-text embedding (ALIGN) models. With the advances in large language models, rapid progress has been made in this field. For example, CLIP and ALIGN demonstrate that pretraining dual-encoder models with contrastive objectives on large-scale noisy image-text pairs can learn representation with cross-modal alignment ability and show strong performance in zero-shot downstream tasks such as open-vocabulary image recognition.

In a typical two-stage framework adapting vision-language models for open-vocabulary panoptic segmentation, images are generally first processed by a mask generator to obtain mask proposals (e.g., mask predictions). Then, each masked image crop is generated and fed into a vision-language model (e.g., CLIP) for classification. For example, one approach includes a two-stage pipeline utilizing a class-agnostic mask generator and a frozen (i.e., non-trainable) CLIP encoder for cross-modal alignment. In some approaches, mask proposals are leveraged as attention masks in the vision-language model backbone to efficiently avoid multiple forwarding processes for the masked crops. Many variations to these frameworks have been contemplated. For example, some techniques involve the use of a stable diffusion model as a frozen backbone for the mask generator, resulting in a significant performance boost. However, even with such advances, these methodologies still rely on a two-stage framework where the mask generator and vision-language classifier extract features from raw images separately (i.e., features are extracted from raw images multiple times), resulting in inefficiency and ineffectiveness.

In view of the observations above, implementations for open-vocabulary panoptic segmentation using a single-stage framework are provided. A single-stage framework for open-vocabulary panoptic segmentation can be implemented in various ways. In some implementations, the single-stage framework implements a vision-language model backbone that unifies the mask generator and vision-language classifier. For example, a CLIP-based solution can be used to provide predicted masks and open-vocabulary recognition. Although sharing the feature extractor is a straightforward solution, there are other considerations. First, fine-tuning the vision-language model backbone can disrupt the alignment between image and text features, resulting in poor performance on out-of-vocabulary categories. Existing approaches rely on another separate backbone for mask generator, but this increases model size and computational costs. Second, vision-language models, such as CLIP models, are typically pretrained on relatively lower-resolution inputs. Dense prediction tasks, however, perform better with higher-resolution inputs. This makes it difficult to directly apply such pretrained vision-language model backbones to downstream dense prediction tasks. Consequently, existing approaches perform mask segmentation and CLIP classification at different input scales, leading to sub-optimal performance.

To alleviate the considerations described above, both the mask generator and vision-language classifier can be built on top of a shared frozen convolutional (FC) vision-language model backbone, resulting in a single-stage framework. For example, in some implementations, the framework includes a single FC-CLIP model as the shared feature extractor. The use of a shared model backbone provides a design that has relatively fast training and inference speeds (compared to two-stage frameworks). The frozen vision-language model backbone keeps the pretrained image-text feature alignment intact, allowing out-of-vocabulary classification. In some implementations, the frozen vision-language model backbone serves as a strong mask generator by appending a lightweight pixel decoder and mask decoder. The convolutional vision-language model (based on a convolutional neural network (CNN)) has a better generalization ability compared to vision transformer-based (ViT) vision-language models, especially when the input size scales up. As such, convolutional network-based models perform well in dense prediction tasks across different input sizes.

Figure 1:
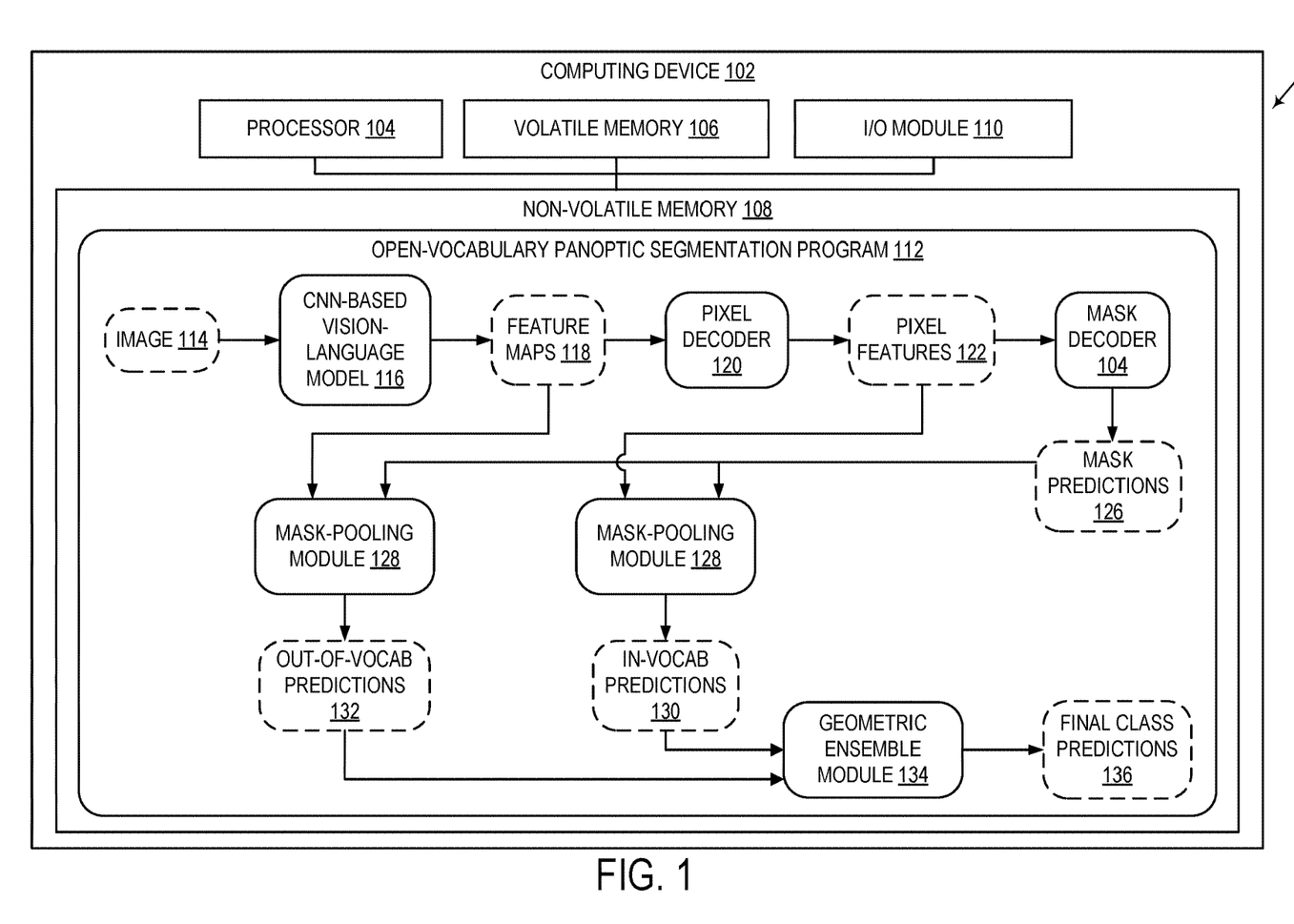
FIG. 1 shows a schematic view of an example computing system configured to perform open-vocabulary panoptic segmentation using a single-stage framework.

Turning now to the drawings, single-stage frameworks for open-vocabulary panoptic segmentation are provided. FIG. 1 shows a schematic view of an example computing system 100 configured to perform open-vocabulary panoptic segmentation using a single-stage framework. The computing system 100 includes a computing device 102 that further includes a processor 104 (e.g., central processing units, or "CPUs"), volatile memory 106, non-volatile memory 108, and I/O module 110, all operatively coupled to each other. The non-volatile memory 108 stores an open-vocabulary panoptic segmentation program 112, which contains instructions for the various software modules described herein for execution by the processor 104.

Upon execution by the processor 104, the instructions stored in the open-vocabulary panoptic segmentation program 112 cause the processor 104 to receive an image 114. The image 114 can be received in various ways. For example, a user can provide and/or upload the image 114 to the computing device 102. The image 114 can be received in various file formats. In some implementations, the open-vocabulary panoptic segmentation program 112 is configured with the capability of performing panoptic segmentation on a video file. In such cases, the video data can be split into a plurality of images, and the open-vocabulary panoptic segmentation program 112 performs panoptic segmentation on each image individually.

The open-vocabulary panoptic segmentation program 112 depicted in FIG. 1 is configured to perform panoptic segmentation using a single-stage framework. The framework relies on a CNN-based vision-language model backbone 116 that provides shared features for various components within the framework. Various vision-language models can be utilized. In some implementations, the framework utilizes a CNN-based CLIP model. To keep the pretrained image-text feature alignment intact, the CNN-based vision-language model backbone 116 can be configured to be non-trainable (i.e., frozen) to prevent fine-tuning that could otherwise disrupt the pretrained image-text feature alignment.

The single-stage framework includes extracting feature maps 118 from the image 114 using the CNN-based vision-language model backbone 116. In some implementations, the CNN-based vision-language model backbone 116 is configured to receive images of a predetermined resolution as input. For example, the CNN-based vision-language model backbone 116 could be trained on datasets containing images of a certain resolution and, as such, performs better when receiving similar images as input. As received images can vary in resolution, the framework can include a resizing process to resize the received image 114 to the predetermined resolution. Resizing can be performed in various ways. For example, dimensions that are too large can be cropped, and dimensions that are too small can be padded (e.g., with black pixels). The predetermined resolution can be any resolution. In some implementations, the CNN-based vision-language model backbone 116 is configured to receive high-resolution images (e.g., resolutions of at least 1024 by 1024 pixels) as input. As used throughout this disclosure, "high-resolution" and "low-resolution" are used as relative descriptors and can include any resolution.

The extracted feature maps 118 are fed into a pixel decoder 120, resulting in pixel features 122 that can then be fed into a mask decoder 124 to provide mask predictions 126 (which can also be referred to as mask proposals). Mask predictions 126 provide instance segmentation that identifies and delineates detected objects in the image 114. The framework further includes an in-vocabulary classifier and an out-of-vocabulary classifier to provide class predictions for the mask predictions 126.

The class prediction process includes performing in-vocabulary mask classification for each of the mask predictions 126 using a mask-pooling module 128. The mask-pooling module 128 performs mask-pooling over the pixel features 122 provided by the pixel decoder 120 to generate in-vocabulary class predictions 130, which correspond to the mask predictions 126. In another branch, the class prediction process includes performing out-of-vocabulary mask classification for each of the mask predictions 126 using the mask-pooling module 128. For out-of-vocabulary mask classification, the mask-pooling module 128 performs mask-pooling over the feature maps 118 provided by the CNN-based vision-language model backbone 116 to generate out-of-vocabulary class predictions 132. The in-vocabulary class predictions 130 and out-of-vocabulary class predictions 132 are then fused by a geometric ensemble module 134 to provide final class predictions 136.

Output of the open-vocabulary panoptic segmentation process can include the mask predictions 126 and the associated predicted classifications 136. The out-of-vocabulary classifier enables the panoptic segmentation process to provide class predictions outside of the limited number of semantic classes learned from an annotated dataset. This open-vocabulary approach allows for the panoptic segmentation process to classify objects with a wider vocabulary, allowing for more general applications in real-word settings. FIG. 1 provides a general single-stage framework for open-vocabulary panoptic segmentation. Further details regarding individual components and modules within the framework are provided in the sections below.

Mathematically, open-vocabulary panoptic segmentation can be described as aiming to segment the image $I \in \mathbb{R}^{H \times W \times 3}$ into a set of non-overlapping masks with associated semantic labels:

$$\{y_i\}_{i=1}^K = \{(m_i, c_i)\}_{i=1}^K. \quad (1)$$

The K ground truth masks $m_i \in \{0,1\}^{H \times W}$ do not overlap with each other (i.e., $\Sigma_{i=1}^K m_i \leq 1^{H \times W}$) and $c_i$ denotes the ground truth class label of mask $m_i$. During training, a fixed set of class labels $C_{train}$ can be used. During inference, another set of class labels $C_{test}$ can be used. In the open-vocabulary setting, $C_{test}$ may contain novel categories unseen during training (i.e., $C_{train} \neq C_{test}$). The category names of $C_{test}$ (represented in natural language) can be assumed to be available during testing.

Figure 2A:
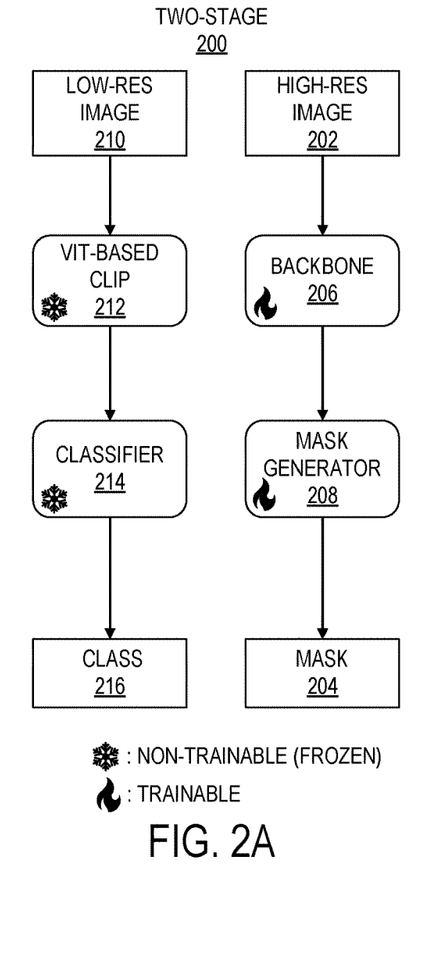
FIG. 2A shows a diagram of an example two-stage framework for open-vocabulary panoptic segmentation.
Figure 2B:
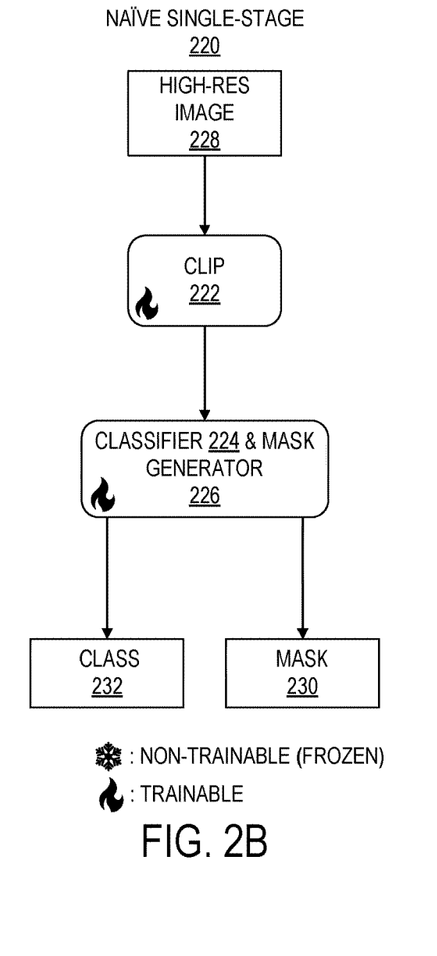
FIG. 2B shows a diagram of an example naïve single-stage framework for open-vocabulary panoptic segmentation using a trainable vision-language model.
Figure 2C:
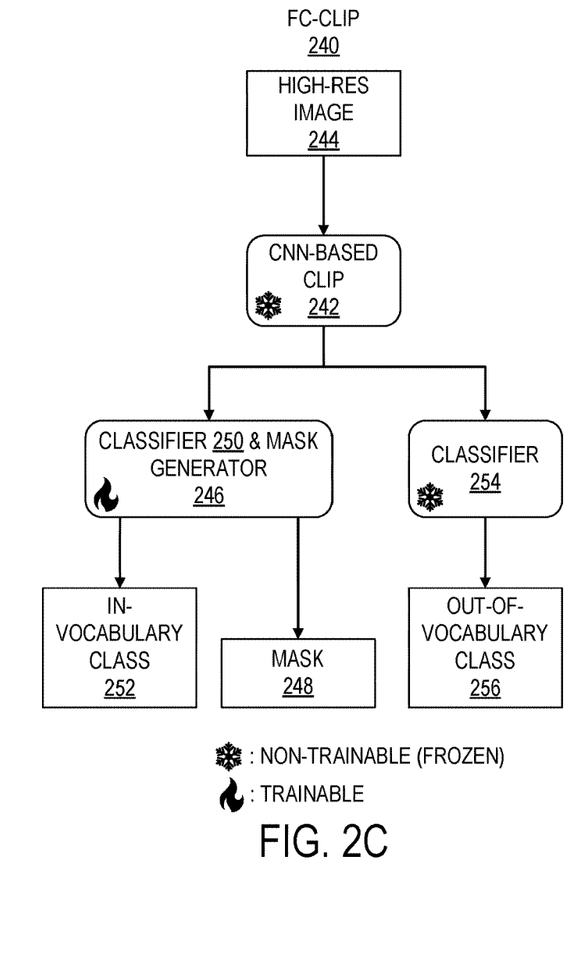
FIG. 2C shows a diagram of an example single-stage framework for open-vocabulary panoptic segmentation using a frozen convolutional neural network-based vision-language model, which may be implemented using the system of FIG. 1 or other suitable hardware and software.

Performing open-vocabulary panoptic segmentation to segment the image $I \in \mathbb{R}^{H \times W \times 3}$ into a set of non-overlapping masks with associated semantic labels can be implemented in various ways. As described above, single-stage frameworks provide several advantages over two-stage frameworks. FIGS. 2A-2C show comparisons between various open-vocabulary panoptic segmentations pipelines, including single- and two-stage frameworks. FIG. 2A shows an example two-stage pipeline 200 for open-vocabulary panoptic segmentation. In the depicted example, the first stage employs a high-resolution image 202 to generate class-agnostic masks 204 using a trainable model backbone 206 and mask generator 208. The second stage feeds both a low-resolution image 210 and the predicted class-agnostic masks 204 (mask predictions input not shown) to a frozen CLIP backbone 212 that operates as an out-of-vocabulary classifier 214 for open-vocabulary recognition, resulting in class predictions 216. This incurs heavy computation, as image features are extracted multiple times.

Mathematically, the two-stage framework pipeline can be described as including a first stage that contains a class-agnostic mask generator $\mathcal{M}$ with parameters $\theta_{\mathcal{M}}$. The mask generator $\mathcal{M}$ generates a set of N mask proposals $\{\hat{m}_i\}_{i=1}^N \in \mathbb{R}^{N \times H \times W}$, given the input image I:

$$\{\hat{m}_i\}_{i=1}^N = \mathcal{M}(I, \theta_{\mathcal{M}}). \quad (2)$$

In the second stage, a CLIP adapter $\mathcal{P}$ takes both image I and mask proposals $\{\hat{m}_i\}_{i=1}^N$ as inputs, where the latter input is used to guide a frozen CLIP model CLIP* (* denotes frozen). The adapter performs mask classification through forwarding processes with either masked crops or masked attention:

$$\{\hat{c}_i\}_{i=1}^N = \mathcal{P}(I, \{\hat{m}_i\}_{i=1}^N; CLIP^*), \quad (3)$$

where $\{\hat{c}_i\}_{i=1}^N \in \mathbb{R}^{N \times |C|}$ refers to the predicted class probabilities for the N predicted masks, $C \in \{C_{train}, C_{test}\}$ depending on training or testing phase, and $|C|$ is the category size.

Two-stage frameworks for open-vocabulary panoptic segmentation have several disadvantages. First, the image features are extracted twice, once for mask generation and again for mask classification. The multiple feature extractions incur heavy computations, making it costly to scale up backbone parameters. Second, the mask generator is often implemented to process high-resolution inputs (e.g., resolutions of at least 1024×1024), whereas the CLIP model is usually pretrained with lower-resolution images (e.g., 224×224). The two-stage pipeline thus feeds high-resolution images into the mask generator and low-resolution images into the CLIP classifier, making the model inefficient.

To avoid increasing the model size and computational cost of duplicate feature extractions, a naïve single-stage framework $\mathcal{F}$ can be implemented by formulating everything together. FIG. 2B shows a diagram of an example naïve single-stage framework 220 for open-vocabulary panoptic segmentation using a trainable CLIP backbone 222. The naïve single-stage framework 220 builds the classifier 224 and mask generator 226 together and fine-tunes the CLIP backbone 222. The framework 220 processes a high-resolution image 228 to produce mask predictions 230, which are then used with the classifier 224 (mask predictions input not shown) to generate associated class predictions 232. In such a framework, both the classifier 224 and mask generator 226 share the pretrained CLIP backbone 222 (not frozen) for extracting features from an input image I.

$$\{\hat{m}_i, \hat{c}_i\}_{i=1}^N = \mathcal{F}(I; CLIP, \theta_{\mathcal{M}}). \quad (4)$$

However, fine-tuning such a single-stage framework 220 can cause a misalignment between image and text features in the pretrained CLIP model 222 and can lead to sub-optimal performance, especially for novel unseen categories. Furthermore, training costs are substantial.

Although a frozen CLIP backbone can provide sufficient features for mask generation while preserving the image-text aligned representation, CLIP models are usually pretrained on low resolution images (e.g., 224×224) whereas segmentation models prefer higher-resolution inputs (e.g., 800× 1333, 1024×2048, etc.). This discrepancy can result in significant performance degradation (e.g., when applying a frozen CLIP on large input images). For example, CLIP models utilizing a ViT backbone do not transfer well to different input sizes. Although such issues could be alleviated by extra careful designs (e.g., side adapter or cost aggregation), performance degradation still remains a problem.

In contrast to ViT-based CLIP models, CNN-based CLIP models exhibit better generalization ability to different input sizes due to their fully convolutional nature. As such, a single-stage open-vocabulary panoptic segmentation framework can be implemented using a single frozen convolutional CLIP (FC-CLIP) backbone $CLIP_{CNN}^*$:

$$\{\hat{m}_i, \hat{c}_i\}_{i=1}^N = \mathcal{F}(I; CLIP_{CNN}^*, \theta_M). \quad (5)$$

FIG. 2C shows a diagram of an example single-stage framework 240 for open-vocabulary panoptic segmentation using an FC-CLIP model backbone 242. The "frozen CLIP" maintains the open-vocabulary recognition and can serve as a strong mask generator, and "convolutional CLIP" generalizes well to large input sizes. The single-stage framework 240 employs a shared FC-CLIP 242 that processes a high-resolution image 244 using three components: a class-agnostic mask generator 246 for generating mask predictions 248, an in-vocabulary classifier 250 for generating in-vocabulary class predictions 252 for the mask predictions 248 (mask predictions input not shown), and an out-of-vocabulary classifier 254 for generating out-of-vocabulary class predictions 256 for the mask predictions 248 (mask predictions input not shown).

FC-CLIP can be implemented to leverage the semantic features of a frozen CNN-based CLIP backbone for both mask generation and CLIP classification. Unlike previous approaches, which often train a separate mask generator and ignore the potential reuse of CLIP's semantic features, freezing and sharing the backbone features enable more efficient training and testing by avoiding feature duplication. The CNN-based CLIP backbone not only transfers well to different input resolutions (from its pretrained image size), but also generates multi-scale feature maps. Although the depicted examples in FIG. 2A-2C illustrate frameworks utilizing CLIP models, other CNN-based vision-language models can also be implemented.

Figure 3:
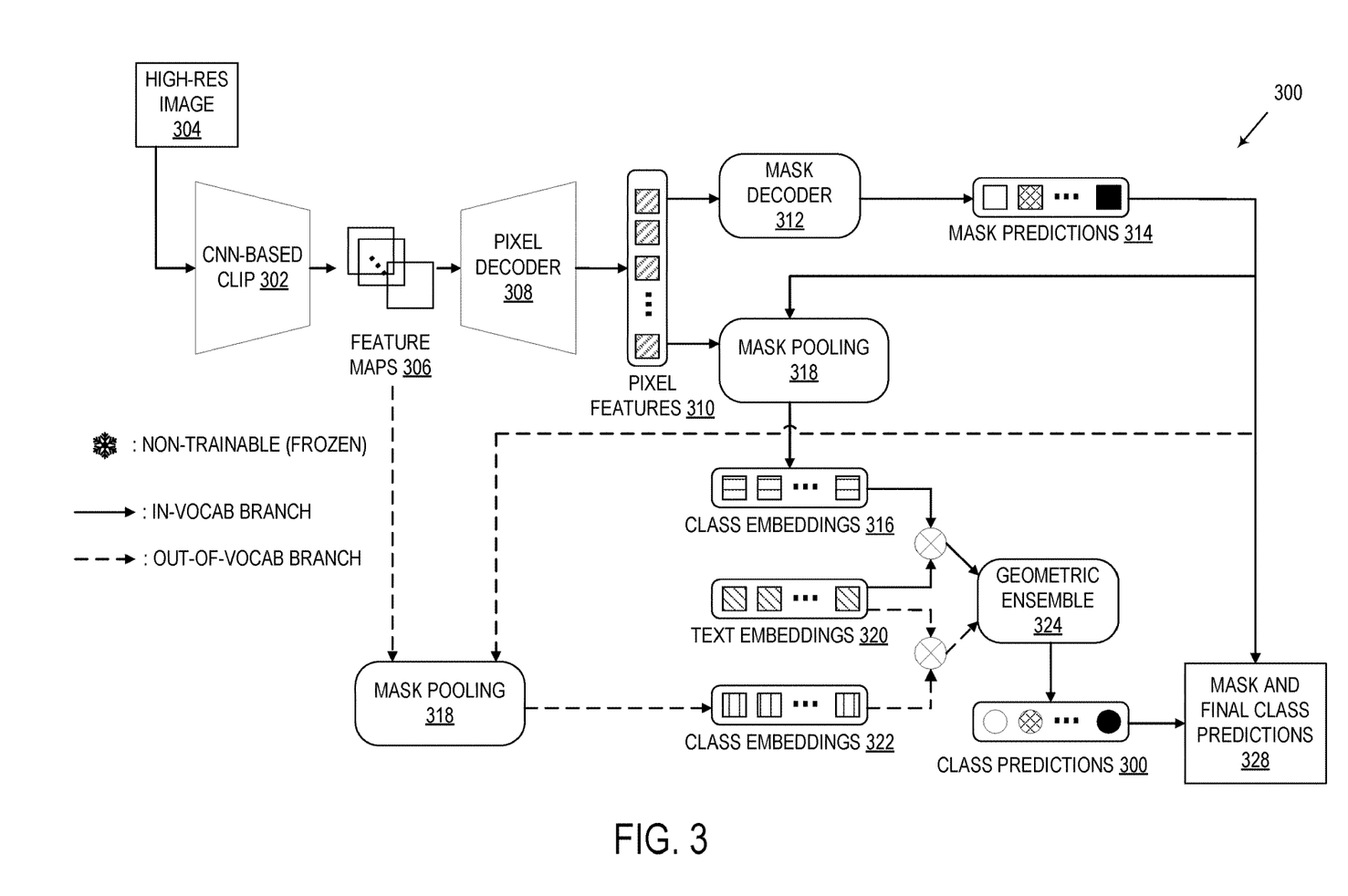
FIG. 3 shows a diagram depicting the process flow of an example single-stage framework for open-vocabulary panoptic segmentation, which may be implemented using the framework of FIG. 2C and the system of FIG. 1 or other suitable hardware and software.

FIG. 3 shows a diagram depicting the process flow of an example single-stage framework 300 for open-vocabulary panoptic segmentation. The example single-stage framework 300 can be based on the framework 240 described in FIG. 2C. In the depicted example, the single-stage framework 300 is implemented with a shared frozen convolutional CLIP backbone 302. Other vision-language models can also be utilized. The open-vocabulary panoptic segmentation process is performed using three main components built on top of the shared FC-CLIP backbone 302. Similar to the framework 240 of FIG. 2C, the three main components include a mask generator, an in-vocabulary classifier, and an out-of-vocabulary classifier.

The process flow starts with an input image 304. In the depicted example, the input image 304 is a high-resolution image with a resolution of at least 1024 by 1024 pixels. The single-stage framework 300 can be configured to process images of any resolution. Higher-resolution images enable more accurate mask predictions. In some implementations, the framework 300 includes resizing the input image 304 to a predetermined resolution (such as a resolution in which the shared FC-CLIP backbone 302 is configured to receive) before performing panoptic segmentation. The resizing process can be performed in various ways, which can include image cropping and padding.

The shared FC-CLIP backbone 302 processes the input image 304 to extract feature maps 306. A pixel decoder 308 is then used to generate pixel features 310 from the feature maps 306. In some implementations, the pixel decoder 308 is enhanced with axial attention to improve the features extracted from the FC-CLIP backbone 302. The pixel features 310, together with a set of object queries (not shown), can be passed through a mask decoder 312 to generate class-agnostic mask predictions 314. In some implementations, matrix multiplication is performed between the object queries and pixel features 310 to generate the mask predictions 314. A mask-wise merging scheme can also be implemented for the mask predictions 314. The mask decoder 312 can be implemented in various ways. In some implementations, the mask decoder 312 includes k-means cross-attention, self-attention, and a feed-forward network. The mask decoder 312 can be implemented as a series of mask decoders implemented to generate the class-agnostic mask predictions 314. For example, the mask decoder 312 can be implemented as a series of six mask decoders.

During training, the predicted masks 314 are matched with ground-truth masks in a one-to-one manner through Hungarian matching and are supervised accordingly. As the number of object queries is often greater than the number of labeled masks, only a subset of predicted masks is typically optimized through this matching process. No penalty is applied to the remaining unmatched proposals, which provides more mask proposals to be obtained.

Once the mask predictions 314 are generated, the in-vocabulary classifier yields class embeddings 316 by mask-pooling 318 over the pixel features 310 from pixel decoder 308. In-vocabulary classification of the mask predictions 314 can be performed with category text embeddings 320 in a contrastive manner, where the class embeddings 316 for each mask prediction 314 and category text embeddings 320 are projected into a common embedding space. In some implementations, the classification logits (before performing SoftMax) are obtained by matrix multiplication between the predicted class embeddings 316 and category text embeddings 320. Text embeddings 320 can be obtained by feeding category names into a CLIP text encoder, which can be performed beforehand and cached in memory to serve as text classifiers, thus causing negligible additional costs.

The predicted class probability by in-vocabulary classifier can be defined as follows: $\forall i=1, \ldots, N$ $$\hat{c}_{i,in} = \text{softmax}\left(\frac{1}{T}[\cos(v_i, t_1), \cos(v_i, t_2), \ldots, \cos(v_i, t_{|C|})]\right), \quad (6)$$

where T is a learnable temperature parameter with initialization of 0.07 to control the sharpness of the distribution, cos is cosine distance measurement, $v_i$ is the class embeddings for i-th predicted mask, which is obtained by mask pooling 318 over the final pixel features 310 from pixel decoder 308. $t_j$ is the category name's text embeddings 320 of class j, which can be obtained by feeding the category name to a CLIP-pretrained text encoder.

During inference, the in-vocabulary classifier alone fails to generalize to completely novel unseen classes since the model 302 is trained on a finite set of categories and thus could not recognize diverse novel concepts. To address this issue, the out-of-vocabulary classifier provides out-of-vocabulary classification of the mask predictions 314. The out-of-vocabulary classifier yields class embeddings 322 by mask pooling 318 the frozen CLIP backbone features 306, aiming to borrow the pretrained (intact) open-vocabulary recognition ability from CLIP. Similar to in-vocabulary classification, out-of-vocabulary classification of the mask predictions 314 can be performed with category text embeddings 320 in a contrastive manner.

Unlike two-stage frameworks where one or multiple forward processes of CLIP are needed, the adopted out-of-vocabulary classifier introduces marginal additional costs since the backbone features 306 are already extracted (and only lightweight mask-pooling 318 is performed). The predicted class probability by out-of-vocabulary classifier $\hat{c}_{i,out}$ is then obtained in a manner similar to the in-vocabulary classifier $\hat{c}_{i,in}$, replacing $v_i$ with the mask-pooled features over frozen CLIP backbone features 306. This classifier maintains the original CLIP feature distribution, allowing for better recognition of new categories.

The framework 300 includes the use of geometric ensemble 324 to fuse the classification scores between the in-vocabulary and out-of-vocabulary classifiers to generate final class predictions 326 for the mask predictions 314. That is, $\forall i=1, \ldots, N$ $$\hat{c}_i = \begin{cases} (\hat{c}_{i,in})^{(1-\alpha)} \cdot (\hat{c}_{i,out})^{\alpha}, & \text{if } i \in C_{train} \\ (\hat{c}_{i,in})^{(1-\beta)} \cdot (\hat{c}_{i,out})^{\beta}, & \text{otherwise} \end{cases} \quad (7)$$

where the subscripts in and out refer to in-vocabulary and out-of-vocabulary classifier, respectively, and $\alpha, \beta \in [0,1]$ balance the predictions between in- and out-of-vocabulary classifiers for seen and novel unseen categories. In some implementations, the classification process is initialized with $\alpha=0.4$ and $\beta=0.8$. The mask predictions 314 and final class predictions 326 provide the output 328 for the open-vocabulary panoptic segmentation of the input image 304.

Figure 4:
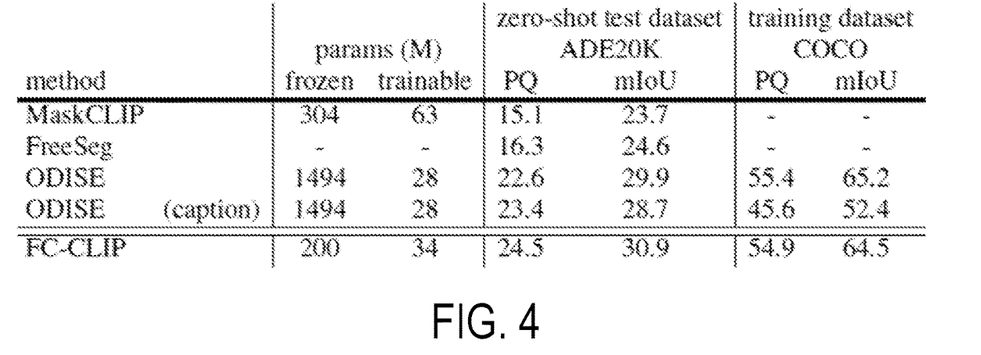
FIGS. 4-9 show tables and charts comparing performance results of example single-stage framework implementations, which may be implemented using the system of FIG. 1 or other suitable hardware and software, for open-vocabulary panoptic segmentation against known methods.

FIGS. 4-9 show performance results from example open-vocabulary panoptic segmentation frameworks, such as the one described in FIG. 3. FIG. 4 is a table comparing panoptic quality (PQ) and the mean intersection-over-union (mIoU) of an example FC-CLIP single-stage framework and other known methods. Performance results are based on zero-shot open vocabulary panoptic segmentation on the ADE20K dataset. All methods were trained on the COCO dataset. As shown, the example FC-CLIP framework achieves significantly better performance compared to MaskCLIP (a transformer-based approach with a visual encoder). With +9.4 PQ and +7.2 mIoU, the example FC-CLIP outperforms MaskCLIP despite using fewer frozen (-104M) and trainable (-29M) parameters. When compared to the concurrent methods FreeSeg (a generic framework to accomplish unified, universal, and open-vocabulary image segmentation) and ODISE (a diffusion-based model), the advantages of FC-CLIP persist. The example FC-CLIP is +8.2 PQ better than FreeSeg and +1.9 PQ better than ODISE under the same training settings (without using COCO-Stuff annotations). Compared to ODISE with caption for supervision, the example FC-CLIP still outperforms it by +1.1 PQ. Moreover, the example FC-CLIP has 7.5× (6.5×) significantly fewer frozen (total) parameters compared to ODISE, which utilizes a strong large backbone from stable diffusion for feature extraction.

Figure 5:
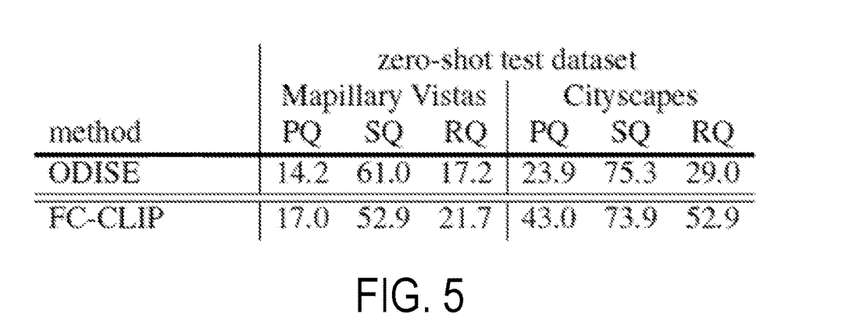

FIG. 5 is a table comparing PQ, segmentation quality (SQ), and recognition quality (RQ) of an example FC-CLIP single-stage framework and ODISE. Performance results are based on zero-shot open vocabulary panoptic segmentation on the Cityscapes and Mapillary Vistas datasets, which focus on street driving scenes. Compared to ODISE, the example FC-CLIP achieves better performances on both datasets, outperforming ODISE by +2.8 PQ and +19.1 PQ on Mapillary Vistas and Cityscapes, respectively. In the depicted example, SQ is lower for FC-CLIP due to a weaker mask generator compared to ODISE, which utilizes a larger backbone and larger input size (e.g., on Cityscapes, ODISE resizes shorter edge to 1024, which leads to 1024×2048 input resolution, while the example FC-CLIP resizes the longer side to 1281, which leads to 641×1281 effective input size).

Figure 6:
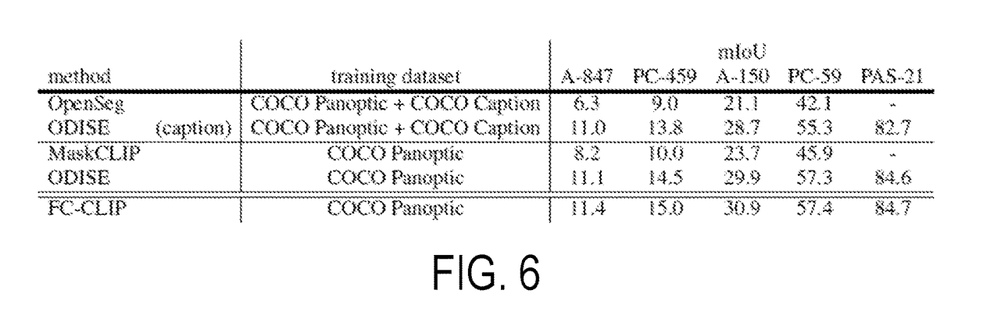

FIG. 6 is a table comparing mIoU of an example FC-CLIP single-stage framework and other known methods across various datasets. With the same training annotations used, FC-CLIP outperforms MaskCLIP by +3.2, +5.0, +7.2, +11.5 mIoU across datasets A-847, PC-459, A-150, and PC-59, respectively. Compared to methods with caption annotations, FC-CLIP persists its advantages, outperforming ODISE (caption) by +0.4, +1.2, +2.2, +2.1, +2.0 mIoU across datasets A-847, PC-459, A-150, PC-59, and PAS-21 respectively.

Figure 7:
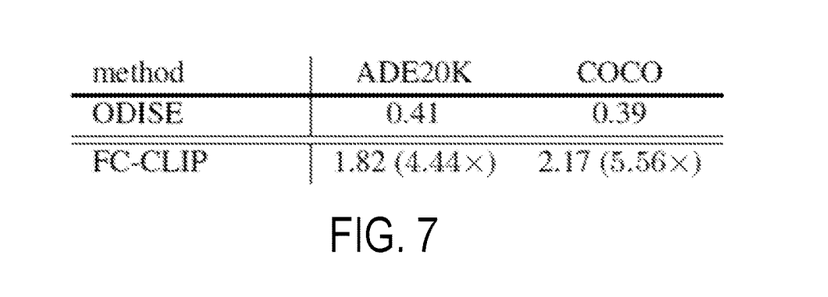

FIG. 7 is a table comparing inference speed of an example FC-CLIP single-stage framework and ODISE. Performance results are shown in frames per second (FPS). ODISE utilizes a much larger backbone compared to the example FC-CLIP. It also uses a much larger input size with shorter edge resized to 1024, which leads to a typical size of 1024×1706 on COCO or 1024×2048 on Cityscapes. Nevertheless, the example FC-CLIP provides a significantly faster inference time with superior performances despite these disadvantages (the example FC-CLIP runs 4.44× and 5.56× faster than ODISE on the ADE20K and COCO datasets, respectively).

Figure 8:
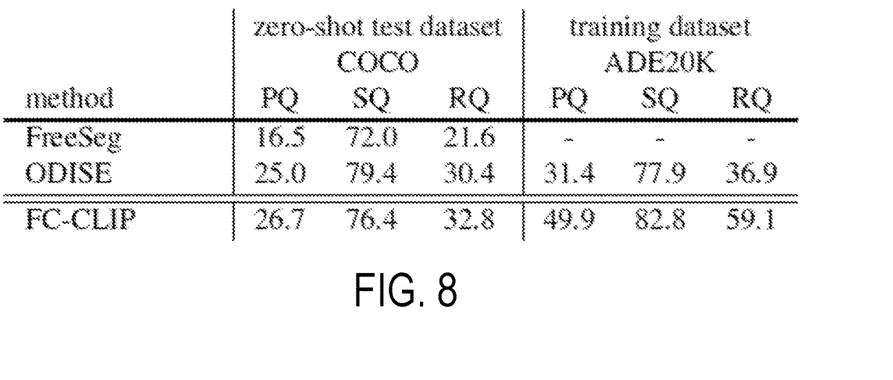

FIG. 8 is a table comparing PQ, SQ, and RQ of an example FC-CLIP single-stage framework and other known methods. Performance results are based on models trained on the ADE20K dataset with panoptic annotation and evaluated on the COCO panoptic dataset. As shown, the example FC-CLIP outperforms FreeSeg by +10.2 PQ and ODISE by +1.7 PQ on the COCO dataset.

Figure 9:
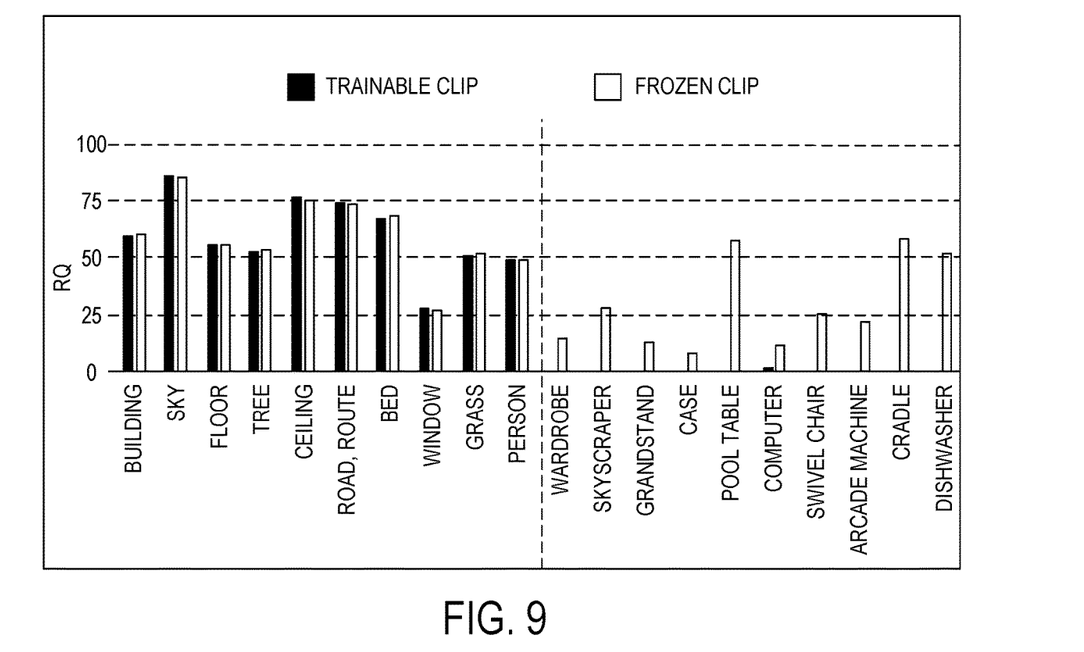

FIG. 9 is a chart comparing the RQ performance of a trainable CLIP variant and a frozen CLIP variant. The same mask proposals are utilized for both models. Performance results are shown for ten seen classes (left) and ten unseen classes (right). The ten seen classes are shared by both the COCO and ADE20K datasets, and the ten unseen classes are only included in the ADE20K dataset. As shown, tuning the CLIP backbone leads to similar performances for seen classes and worser performance on unseen concepts as tuning breaks the CLIP feature alignment, thus losing its recognition ability on a wider vocabulary.

Figure 10:
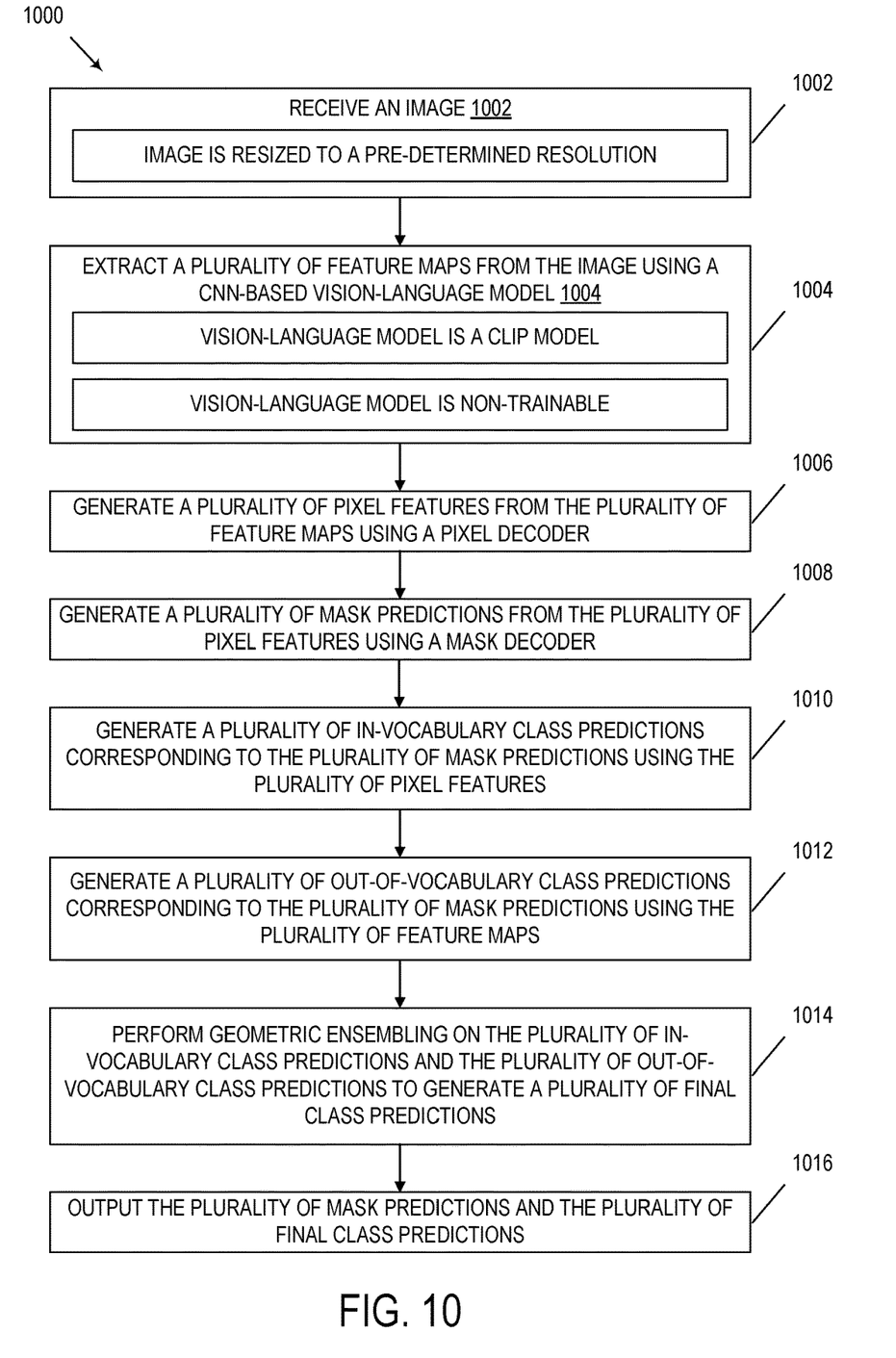
FIG. 10 shows a flow diagram of an example method for performing open-vocabulary panoptic segmentation using a single-stage framework, which may be implemented using the system of FIG. 1 or other suitable hardware and software.

FIG. 10 shows a flow diagram of an example method 1000 for performing open-vocabulary panoptic segmentation using a single-stage framework. At step 1002, the method 1000 includes receiving an image. The image can be received in various formats and in various ways, such as from user upload. In some implementations, media content is received, and the image is retrieved from the media content. For example, some implementations can be configured to perform panoptic segmentation on a video file. In such cases, frames of the video file can be individually processed as images.

At step 1004, the method 1000 includes extracting a plurality of feature maps from the image using a CNN-based vision-language model. Various vision-language models can be utilized. For example, the vision-language model can be implemented as a CLIP model. In some implementations, the CNN-based vision-language model is a non-trainable (i.e., frozen) model. The CNN-based vision-language model can be configured to process images of predetermined resolutions. Typically, the predetermined resolution is a high-resolution (e.g., resolution of at least 1024 by 1024 pixels). In some implementations, the image is resized to the predetermined resolution. Resizing the image can be performed in various ways. For example, image cropping and/or padding can be performed to resize the image.

At step 1006, the method 1000 includes generating a plurality of pixel features from the plurality of feature maps using a pixel decoder. Various types of pixel decoders can be utilized. For example, a lightweight pixel decoder can be used for efficiency. In some implementations, the pixel decoder is enhanced with axial attention, which can improve the feature maps extracted from the CNN-based vision-language model.

At step 1008, the method 1000 includes generating a plurality of mask predictions from the plurality of pixel features. The mask predictions can be generated in various ways. In some implementations, the mask predictions are generated by feeding the plurality of pixel features and a set of object queries into one or more mask decoders. In further implementations, matrix multiplication is performed between the object queries and pixel features to generate the mask predictions. Different mask decoders can be utilized. The mask decoder can be implemented as a series of mask decoders. In some implementations, each mask decoder includes k-means cross-attention, self-attention, and a feed-forward network.

At step 1010, the method 1000 includes generating a plurality of in-vocabulary class predictions corresponding to the plurality of mask predictions using the plurality of pixel features. Generating the plurality of in-vocabulary class predictions can include mask-pooling over the plurality of pixel features to generate a plurality of in-vocabulary class embeddings for each of the mask predictions. The in-vocabulary class embeddings can then be used with a plurality of text embeddings in a contrastive manner to generate the plurality of in-vocabulary class predictions. The text embeddings can be generated in various ways. In some implementations, the text embeddings are generated by feeding category names into a pre-trained text encoder, such as a CLIP text encoder. The text embeddings can be generated beforehand and cached in memory.

At step 1012, the method 1000 includes generating a plurality of out-of-vocabulary class predictions corresponding to the plurality of mask predictions using the plurality of feature maps. Generating the plurality of out-of-vocabulary class predictions can include mask-pooling over the plurality of features maps to generate a plurality of in-vocabulary class embeddings for each of the mask predictions. The out-of-vocabulary class embeddings can then be used with the plurality of text embeddings in a contrastive manner to generate the plurality of out-of-vocabulary class predictions.

At step 1014, the method 1000 includes performing geometric ensembling on the plurality of in-vocabulary class predictions and the plurality of out-of-vocabulary class predictions to generate a plurality of final class predictions.

In some implementations, the geometric ensembling includes using a weighted formula to fuse the plurality of in-vocabulary class predictions and the plurality of out-of-vocabulary class predictions. In further implementations, out-of-vocabulary class predictions are weighted higher than the in-vocabulary class predictions.

At step 1016, the method 1000 includes outputting the plurality of mask predictions and the plurality of final class predictions. Such information provides the result of panoptic segmentation, which identifies instances of objects and predicted classification of said instances.

Single-stage frozen convolutional vision-language model frameworks described herein provide a simple yet effective framework for open vocabulary panoptic segmentation. For example, FC-CLIP provides efficiency by building everything on top of a shared frozen convolutional CLIP backbone, which not only significantly reduces training and testing costs but also performs well against other known methods for open vocabulary panoptic segmentation.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
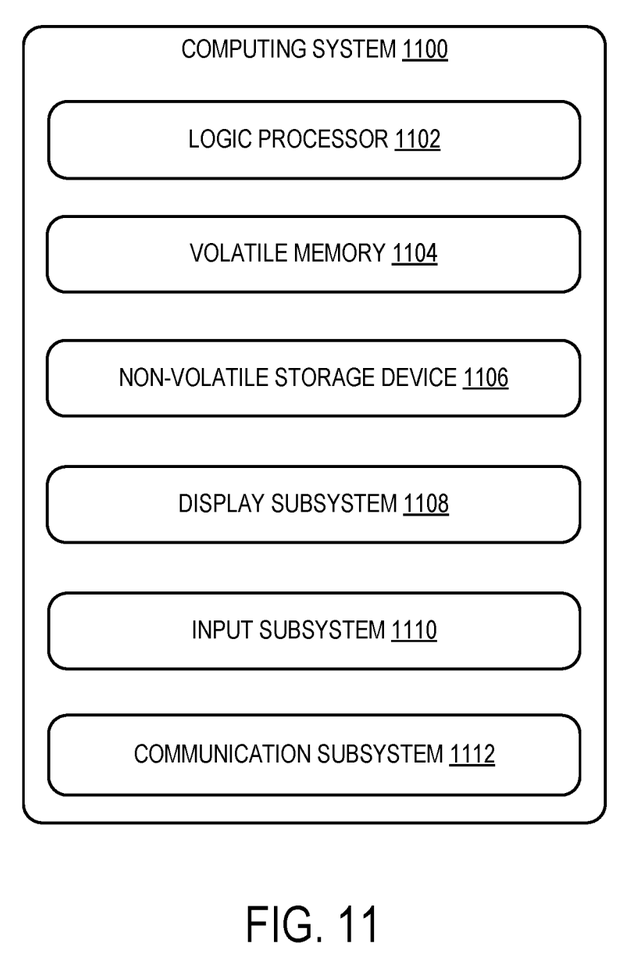
FIG. 11 shows a schematic view of an example computing environment in which the computer device of FIG. 1 may be enacted.

FIG. 11 schematically shows a non-limiting embodiment of a computing system 1100 that can enact one or more of the methods and processes described above. Computing system 1100 is shown in simplified form. Computing system 1100 may embody the computing system 1 described above and illustrated in FIG. 1. Components of computing system 1100 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 1100 includes a logic processor 1102 volatile memory 1104, and a non-volatile storage device 1106. Computing system 1100 may optionally include a display subsystem 1108, input subsystem 1110, communication subsystem 1112, and/or other components not shown in FIG. 11.

Logic processor 1102 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 1102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1106 includes one or more physical devices configured to hold instructions executable by the logic processors to implement the methods and processes described herein. When such methods and processes are implemented, the state of non-volatile storage device 1106 may be transformed—e.g., to hold different data.

Non-volatile storage device 1106 may include physical devices that are removable and/or built in. Non-volatile storage device 1106 may include optical memory, semiconductor memory, and/or magnetic memory, or other mass storage device technology. Non-volatile storage device 1106 may include nonvolatile, dynamic, static, read/write, read-only, sequential-access, location-addressable, file-addressable, and/or content-addressable devices. It will be appreciated that non-volatile storage device 1106 is configured to hold instructions even when power is cut to the non-volatile storage device 1106.

Volatile memory 1104 may include physical devices that include random access memory. Volatile memory 1104 is typically utilized by logic processor 1102 to temporarily store information during processing of software instructions. It will be appreciated that volatile memory 1104 typically does not continue to store instructions when power is cut to the volatile memory 1104.

Aspects of logic processor 1102, volatile memory 1104, and non-volatile storage device 1106 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 typically implemented in software by a processor to perform a particular function using portions of volatile memory, which function involves transformative processing that specially configures the processor to perform the function. Thus, a module, program, or engine may be instantiated via logic processor 1102 executing instructions held by non-volatile storage device 1106, using portions of volatile memory 1104. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1108 may be used to present a visual representation of data held by non-volatile storage device 1106. The visual representation may take the form of a graphical user interface (GUI). As the herein described methods and processes change the data held by the non-volatile storage device, and thus transform the state of the non-volatile storage device, the state of display subsystem 1108 may likewise be transformed to visually represent changes in the underlying data. Display subsystem 1108 may include one or more display devices utilizing virtually any type of technology. Such display devices may be combined with logic processor 1102, volatile memory 1104, and/or non-volatile storage device 1106 in a shared enclosure, or such display devices may be peripheral display devices.

When included, input subsystem 1110 may comprise or interface with one or more user-input devices such as a keyboard, mouse, touch screen, camera, or microphone.

When included, communication subsystem 1112 may be configured to communicatively couple various computing devices described herein with each other, and with other devices. Communication subsystem 1112 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 1100 to send and/or receive messages to and/or from other devices via a network such as the Internet.

"And/or" as used herein is defined as the inclusive or $\vee$, as specified by the following truth table:

| A | B | A $\vee$ B |
|---|---|---|
| True | True | True |
| True | False | True |
| False | True | True |
| False | False | False |

The following paragraphs provide additional description of the subject matter of the present disclosure. One aspect provides a computing system for performing open-vocabulary panoptic segmentation, the computing system comprising: a processor and memory storing instructions that, when executed by the processor, cause the processor to: receive an image; extract a plurality of feature maps from the image using a convolutional neural network-based (CNN-based) vision-language model; generate a plurality of pixel features from the plurality of feature maps using a pixel decoder; generate a plurality of mask predictions from the plurality of pixel features using a mask decoder; generate a plurality of in-vocabulary class predictions corresponding to the plurality of mask predictions using the plurality of pixel features; generate a plurality of out-of-vocabulary class predictions corresponding to the plurality of mask predictions using the plurality of feature maps; perform geometric ensembling on the plurality of in-vocabulary class predictions and the plurality of out-of-vocabulary class predictions to generate a plurality of final class predictions; and output the plurality of mask predictions and the plurality of final class predictions. In this aspect, additionally or alternatively, the CNN-based vision-language model comprises a non-trainable model. In this aspect, additionally or alternatively, the CNN-based vision-language model comprises a contrastive language-image pre-training model. In this aspect, additionally or alternatively, extracting the plurality of feature maps from the image using the CNN-based vision-language model comprises: resizing the image to a predetermined resolution of at least 1024 by 1024 pixels; and feeding the resized image into the CNN-based vision-language model to generate the plurality of feature maps. In this aspect, additionally or alternatively, the image is at least 1024 by 1024 pixels. In this aspect, additionally or alternatively, generating the plurality of mask predictions comprises feeding the plurality of pixel features and a set of object queries into the mask decoder. In this aspect, additionally or alternatively, generating the plurality of in-vocabulary class predictions comprises: mask-pooling over the plurality of pixel features to generate a plurality of in-vocabulary class embeddings for each of the mask predictions; and generating the plurality of in-vocabulary class predictions using the pluralities of in-vocabulary class embeddings and a plurality of text embeddings. In this aspect, additionally or alternatively, the plurality of text embeddings is generated by feeding category names into a pre-trained text encoder. In this aspect, additionally or alternatively, generating the plurality of out-of-vocabulary class predictions comprises: mask-pooling over the plurality of features maps to generate a plurality of out-of-vocabulary class embeddings for each of the mask predictions; and generating the plurality of out-of-vocabulary class predictions using the pluralities of out-of-vocabulary class embeddings and a plurality of text embeddings. In this aspect, additionally or alternatively, performing the geometric ensembling comprises using a weighted formula to fuse the plurality of in-vocabulary class predictions and the plurality of out-of-vocabulary class predictions.

Another aspect provides a method for performing open-vocabulary panoptic segmentation, the method comprising: receiving an image; extracting a plurality of feature maps from the image using a convolutional neural network-based (CNN-based) vision-language model; generating a plurality of pixel features from the plurality of feature maps using a pixel decoder; generating a plurality of mask predictions from the plurality of pixel features using a mask decoder; generating a plurality of in-vocabulary class predictions corresponding to the plurality of mask predictions using the plurality of pixel features; generating a plurality of out-of-vocabulary class predictions corresponding to the plurality of mask predictions using the plurality of feature maps; performing geometric ensembling on the plurality of in-vocabulary class predictions and the plurality of out-of-vocabulary class predictions to generate a plurality of final class predictions; and outputting the plurality of mask predictions and the plurality of final class predictions. In this aspect, additionally or alternatively, the CNN-based vision-language model comprises a non-trainable contrastive language-image pre-training model. In this aspect, additionally or alternatively, extracting the plurality of feature maps from the image using the CNN-based vision-language model comprises: resizing the image to a predetermined resolution of at least 1024 by 1024 pixels; and feeding the resized image into the CNN-based vision-language model to generate the plurality of feature maps. In this aspect, additionally or alternatively, generating the plurality of mask predictions comprises feeding the plurality of pixel features and a set of object queries into the mask decoder. In this aspect, additionally or alternatively, generating the plurality of in-vocabulary class predictions comprises: mask-pooling over the plurality of pixel features to generate a plurality of in-vocabulary class embeddings for each of the mask predictions; and generating the plurality of in-vocabulary class predictions using the pluralities of in-vocabulary class embeddings and a plurality of text embeddings. In this aspect, additionally or alternatively, the plurality of text embeddings is generated by feeding category names into a pre-trained text encoder. In this aspect, additionally or alternatively, generating the plurality of out-of-vocabulary class predictions comprises: mask-pooling over the plurality of features maps to generate a plurality of out-of-vocabulary class embeddings for each of the mask predictions; and generating the plurality of out-of-vocabulary class predictions using the pluralities of out-of-vocabulary class embeddings and a plurality of text embeddings. In this aspect, additionally or alternatively, performing the geometric ensembling comprises using a weighted method to fuse the plurality of in-vocabulary class predictions and the plurality of out-of-vocabulary class predictions.

Another aspect provides a non-transitory computer readable medium for media content editing, the non-transitory computer readable medium comprising instructions that, when executed by a computing device, cause the computing device to implement the method described in the aspect above.

Another aspect provides a computing system for performing open-vocabulary panoptic segmentation, the computing system comprising: a processor and memory storing instructions that, when executed by the processor, cause the processor to: receive media content comprising at least one image; and for each image in the media content, perform panoptic segmentation by: extracting a plurality of feature maps from the image using a non-trainable convolutional neural network-based (CNN-based) contrastive language-image pre-training model; generating a plurality of pixel features from the plurality of feature maps using a pixel decoder; generating a plurality of mask predictions from the plurality of pixel features using a mask decoder; and for each mask prediction, generate a final class prediction by: generating an in-vocabulary class prediction by mask-pooling over the plurality of pixel features; generating an out-of-vocabulary class prediction by mask-pooling over the plurality of pixel features the plurality of feature maps; and generating the final class prediction using the in-vocabulary class prediction and the out-of-vocabulary class prediction.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for performing open-vocabulary panoptic segmentation, the computing system comprising:
   a processor and memory storing instructions that, when executed by the processor, cause the processor to:
   receive an image;
   extract a plurality of feature maps from the image using a convolutional neural network-based (CNN-based) vision-language model;
   generate a plurality of pixel features from the plurality of feature maps using a pixel decoder;
   generate a plurality of mask predictions from the plurality of pixel features using a mask decoder;
   generate a plurality of in-vocabulary class predictions corresponding to the plurality of mask predictions using the plurality of pixel features;
   generate a plurality of out-of-vocabulary class predictions corresponding to the plurality of mask predictions using the plurality of feature maps;
   perform geometric ensembling on the plurality of in-vocabulary class predictions and the plurality of out-of-vocabulary class predictions to generate a plurality of final class predictions; and
output the plurality of mask predictions and the plurality of final class predictions.

2. The computing system of claim 1, wherein the CNN-based vision-language model comprises a non-trainable model.

3. The computing system of claim 1, wherein the CNN-based vision-language model comprises a contrastive language-image pre-training model.

4. The computing system of claim 1, wherein extracting the plurality of feature maps from the image using the CNN-based vision-language model comprises:
resizing the image to a predetermined resolution of at least 1024 by 1024 pixels; and
feeding the resized image into the CNN-based vision-language model to generate the plurality of feature maps.

5. The computing system of claim 1, wherein the image is at least 1024 by 1024 pixels.

6. The computing system of claim 1, wherein generating the plurality of mask predictions comprises feeding the plurality of pixel features and a set of object queries into the mask decoder.

7. The computing system of claim 1, wherein generating the plurality of in-vocabulary class predictions comprises:
mask-pooling over the plurality of pixel features to generate a plurality of in-vocabulary class embeddings for each of the mask predictions; and
generating the plurality of in-vocabulary class predictions using the pluralities of in-vocabulary class embeddings and a plurality of text embeddings.

8. The computing system of claim 7, wherein the plurality of text embeddings is generated by feeding category names into a pre-trained text encoder.

9. The computing system of claim 1, wherein generating the plurality of out-of-vocabulary class predictions comprises:
mask-pooling over the plurality of features maps to generate a plurality of out-of-vocabulary class embeddings for each of the mask predictions; and
generating the plurality of out-of-vocabulary class predictions using the pluralities of out-of-vocabulary class embeddings and a plurality of text embeddings.

10. The computing system of claim 1, wherein performing the geometric ensembling comprises using a weighted formula to fuse the plurality of in-vocabulary class predictions and the plurality of out-of-vocabulary class predictions.

11. A method for performing open-vocabulary panoptic segmentation, the method comprising:
receiving an image;
extracting a plurality of feature maps from the image using a convolutional neural network-based (CNN-based) vision-language model;
generating a plurality of pixel features from the plurality of feature maps using a pixel decoder;
generating a plurality of mask predictions from the plurality of pixel features using a mask decoder;
generating a plurality of in-vocabulary class predictions corresponding to the plurality of mask predictions using the plurality of pixel features;
generating a plurality of out-of-vocabulary class predictions corresponding to the plurality of mask predictions using the plurality of feature maps;
performing geometric ensembling on the plurality of in-vocabulary class predictions and the plurality of out-of-vocabulary class predictions to generate a plurality of final class predictions; and
outputting the plurality of mask predictions and the plurality of final class predictions.

12. The method of claim 11, wherein the CNN-based vision-language model comprises a non-trainable contrastive language-image pre-training model.

13. The method of claim 11, wherein extracting the plurality of feature maps from the image using the CNN-based vision-language model comprises:
resizing the image to a predetermined resolution of at least 1024 by 1024 pixels; and
feeding the resized image into the CNN-based vision-language model to generate the plurality of feature maps.

14. The method of claim 11, wherein generating the plurality of mask predictions comprises feeding the plurality of pixel features and a set of object queries into the mask decoder.

15. The method of claim 11, wherein generating the plurality of in-vocabulary class predictions comprises:
mask-pooling over the plurality of pixel features to generate a plurality of in-vocabulary class embeddings for each of the mask predictions; and
generating the plurality of in-vocabulary class predictions using the pluralities of in-vocabulary class embeddings and a plurality of text embeddings.

16. The method of claim 15, wherein the plurality of text embeddings is generated by feeding category names into a pre-trained text encoder.

17. The method of claim 11, wherein generating the plurality of out-of-vocabulary class predictions comprises:
mask-pooling over the plurality of features maps to generate a plurality of out-of-vocabulary class embeddings for each of the mask predictions; and
generating the plurality of out-of-vocabulary class predictions using the pluralities of out-of-vocabulary class embeddings and a plurality of text embeddings.

18. The method of claim 11, wherein performing the geometric ensembling comprises using a weighted method to fuse the plurality of in-vocabulary class predictions and the plurality of out-of-vocabulary class predictions.

19. A non-transitory computer readable medium for media content editing, the non-transitory computer readable medium comprising instructions that, when executed by a computing device, cause the computing device to implement the method of claim 11.

20. A computing system for performing open-vocabulary panoptic segmentation, the computing system comprising:
a processor and memory storing instructions that, when executed by the processor, cause the processor to:
receive media content comprising at least one image; and
for each image in the media content, perform panoptic segmentation by:
extracting a plurality of feature maps from the image using a non-trainable convolutional neural network-based (CNN-based) contrastive language-image pre-training model;
generating a plurality of pixel features from the plurality of feature maps using a pixel decoder;
generating a plurality of mask predictions from the plurality of pixel features using a mask decoder; and
for each mask prediction, generate a final class prediction by:

generating an in-vocabulary class prediction by mask-pooling over the plurality of pixel features;

generating an out-of-vocabulary class prediction by mask-pooling over the plurality of pixel features the plurality of feature maps; and generating the final class prediction using the in-vocabulary class prediction and the out-of-vocabulary class prediction.

* * * * *